(12) United States Patent
Haven

(10) Patent No.: US 7,294,815 B2
(45) Date of Patent: Nov. 13, 2007

(54) SYSTEM AND METHOD FOR GENERATING POSITIONAL AND ORIENTATION INFORMATION OF AN OBJECT

(75) Inventor: Richard Earl Haven, Sunnyvale, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 123 days.

(21) Appl. No.: 11/220,039

(22) Filed: Sep. 6, 2005

(65) Prior Publication Data

US 2007/0051871 A1 Mar. 8, 2007

(51) Int. Cl.
*G09G 5/00* (2006.01)
(52) U.S. Cl. .................... 250/203.1; 348/169; 345/156
(58) Field of Classification Search ............. 250/203.1, 250/206.1; 348/169–172; 345/156
See application file for complete search history.

(56) References Cited

U.S. PATENT DOCUMENTS

| | | | | |
|---|---|---|---|---|
| 5,023,709 A | * | 6/1991 | Kita et al. .................. | 348/172 |
| 6,061,644 A | * | 5/2000 | Leis ........................... | 702/153 |
| 6,339,748 B1 | * | 1/2002 | Hiramatsu ................... | 702/159 |
| 6,380,923 B1 | * | 4/2002 | Fukumoto et al. .......... | 345/156 |
| 7,109,460 B2 | * | 9/2006 | Diamantstein et al. ... | 250/203.1 |
| 2003/0169339 A1 | * | 9/2003 | Allen et al. ................. | 348/169 |
| 2004/0012559 A1 | * | 1/2004 | Seki et al. ................... | 345/156 |

OTHER PUBLICATIONS

U.S. Appl. No. 11/111,444, filed Apr. 21, 2005, Fouquet et al.
U.S. Appl. No. 11/111,067, filed Apr. 21, 2005, Fouquet et al.

* cited by examiner

*Primary Examiner*—Georgia Epps
*Assistant Examiner*—Stephen Yam

(57) ABSTRACT

A method for generating positional information of an object is carried out by providing a reflector in the object and by providing a personal device containing a light generator and an imager. The personal device is mounted on a person holding the object at a mounting location that is identified to provide a first unobstructed line-of-sight between the light generator and the object and a second unobstructed line-of-sight between the imager and the object.

17 Claims, 11 Drawing Sheets

SYSTEM AND METHOD FOR GENERATING POSITIONAL AND ORIENTATION INFORMATION OF AN OBJECT

DESCRIPTION OF THE RELATED ART

Several types of position-tracking systems that are used for generating three-dimensional (3-D) positional information of objects in free space are known in the art. For example, one type of position-tracking system is incorporated into a video-game interface for tracking an object such as an electronic glove or an electronic gun. Typically, the tracked object incorporates either an active electronic device such as a radio-frequency transmitter, or a passive element such as a mirror, for providing positional information to the position tracking system.

One example of a position-tracking system that tracks a passive element is described in U.S. application Ser. No. 11/111,444 titled "Position determination utilizing a cordless pointing device," filed on 21 Apr. 2005.

FIG. 1 shows this prior-art system 100. System 100 includes a retro-reflector 125, an image collection system 105, and a processor 130. The image collection system 105 includes an on-axis light source 115 and an off-axis light source 120 to generate on-axis light and off-axis light that are directed at the retro-reflector 125. Retro-reflector 125 reflects this light towards imager 110. Imager 110 captures the reflected light and generates two sets of image data. The first set of image data corresponding to the on-axis light includes a stronger indication of the retro-reflector 125 than the second set of image data corresponding to the off-axis light. Positional information related to retro-reflector 125 is generated by taking the difference between the two sets of image data. Because one set of image data includes a stronger indication of retro-reflector 125 than the other set of image data, the difference between the two sets of image data gives a definitive indication of the retro-reflector's position.

Unfortunately, prior-art position-tracking systems such as the one shown in FIG. 1, suffer from various deficiencies. One of these deficiencies can be described using FIG. 2. Here, an obstruction 205 is located between image collection system 105 and retro-reflector 125, thereby preventing light emitted by on-axis light source 115 and an off-axis light source 120 from reaching retro-reflector 125. Consequently, image collection system 105 is unable to generate positional information of retro-reflector 125. Worse yet, obstruction 205 itself may reflect light towards imager 105 thereby leading to generation of erroneous positional information.

The deficiency in the prior-art system of FIG. 2 can be further described by characterizing obstruction 205 as the body of a speaker holding an object such as a pointer, incorporating retro-reflector 125. In this case, the speaker is constrained from moving around freely for fear of blocking light between image collection system 105 and retro-reflector 125.

In addition to position-tracking systems that provide positional information, certain tracking systems incorporate orientation-tracking technologies that provide orientation information of a tracked object. One example of an orientation-tracking technology is described in U.S. application Ser. No. 11/111,067 titled "Orientation determination utilizing a cordless device," filed on 21 Apr. 2005. Here again, as in the case of the position-tracking system described above, the orientation-tracking system suffers from various deficiencies. One of these deficiencies has been described above using the example where a speaker is constrained from moving around freely for fear of obstructing light transmission between the image collection system and the tracked object.

SUMMARY

A method for generating positional information of an object is carried out by providing a reflector in the object and by providing a personal device containing a light generator and an imager. The personal device is mounted on a person holding the object at a mounting location that is identified to provide a first unobstructed line-of-sight between the light generator and the object and a second unobstructed line-of-sight between the imager and the object.

BRIEF DESCRIPTION OF THE DRAWINGS

Many aspects of the invention can be better understood with reference to the following drawings. The components in the drawings are not necessarily to scale. Instead, emphasis is placed upon clearly illustrating the principles of the invention. Moreover, in the drawings, like reference numerals designate corresponding parts throughout the several views.

DETAILED DESCRIPTION

The various embodiments in accordance with the invention relate to a system for generating positional and orientation information of an object incorporating a reflector.

Figure 1:
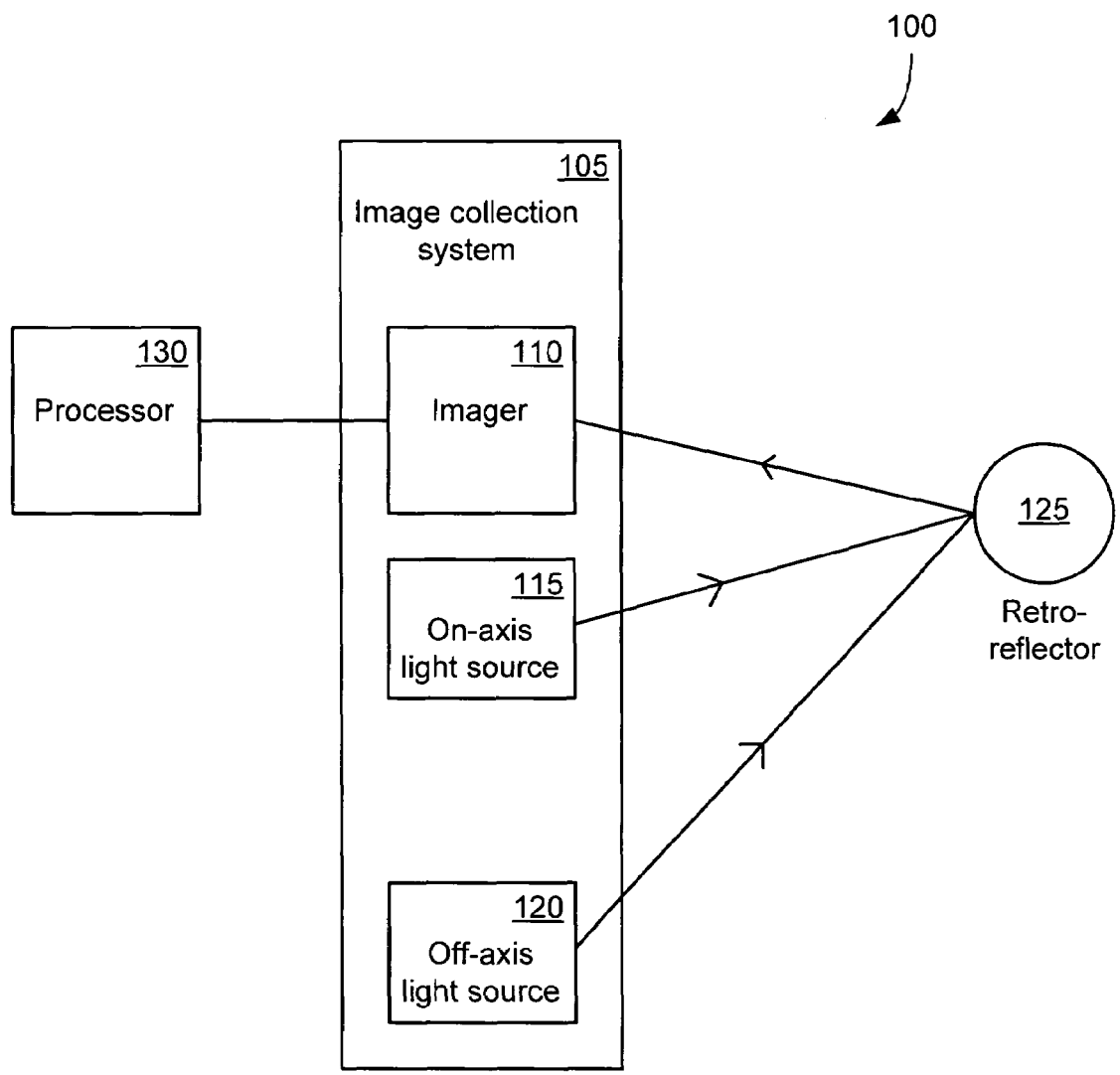
FIG. 1 shows a prior-art system for generating positional information of a passive element—a retro-reflector.
Figure 2:
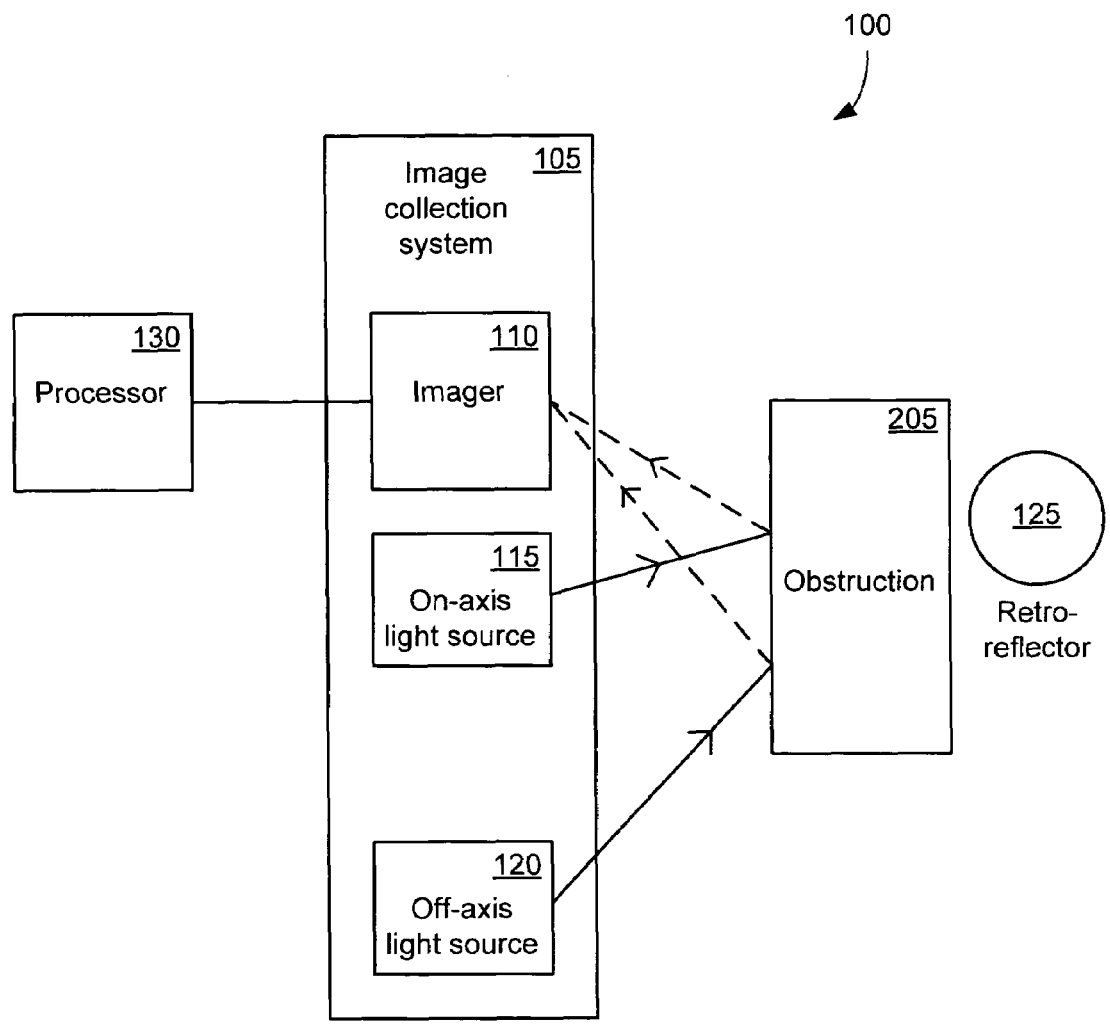
FIG. 2 shows a deficiency that is present in the prior-art system of FIG. 1.
Figure 3:
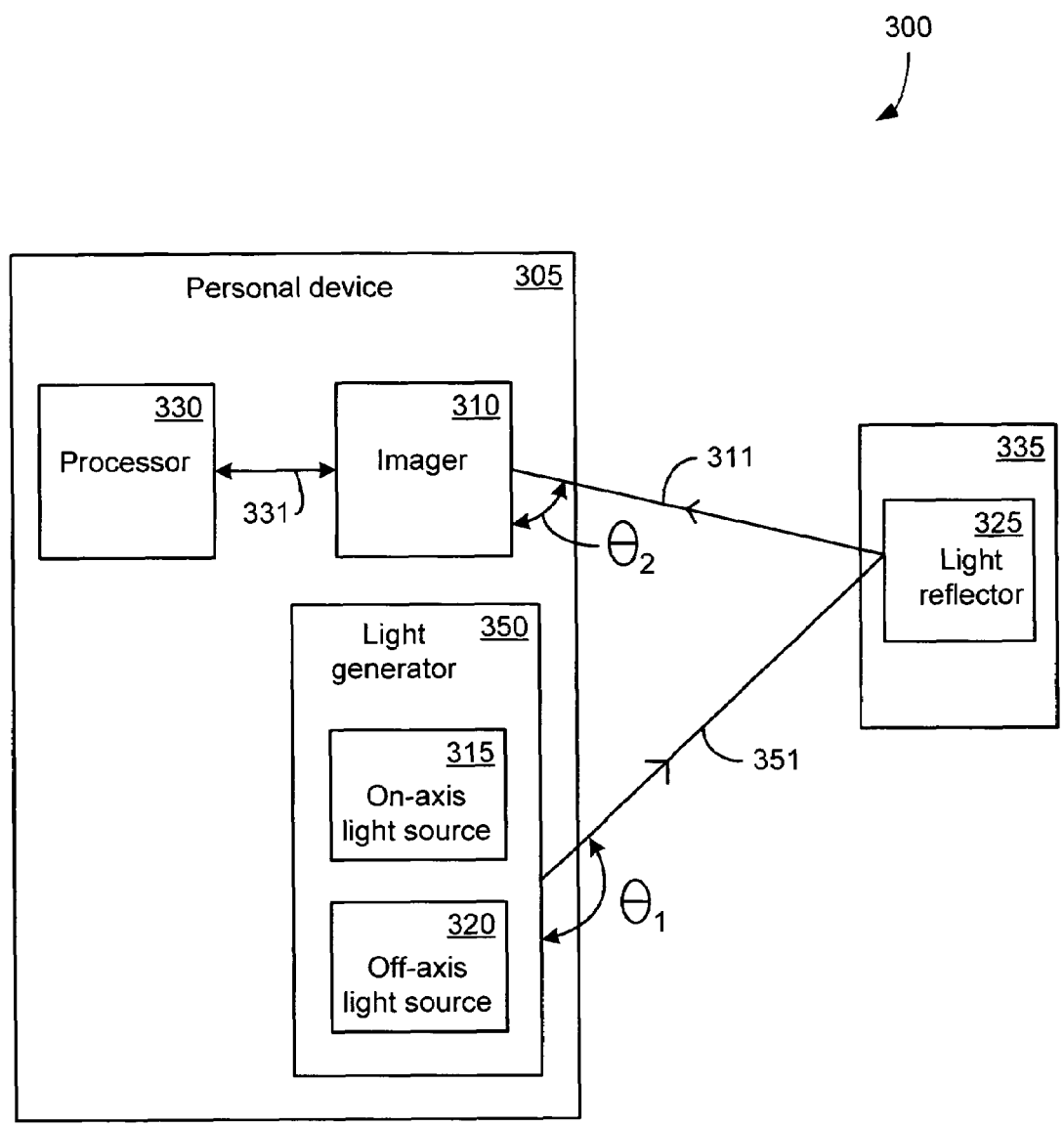
FIG. 3 shows an exemplary embodiment of a system for generating positional and orientation information of an object incorporating a reflector.

FIG. 3 shows a first exemplary embodiment of a system 300 in accordance with the invention that includes a personal device 305 housing an imager 310, a light generator 350, and a processor 330. System 300 further includes a light reflector 325 housed in an object 335.

Optical path 351 generally represents a first unobstructed line-of-sight between light generator 350 and object 335, while optical path 311 generally represents a second unobstructed line-of-sight between object 335 and imager 310. For purposes of description the two line-of-sights will be collectively referred to as an unobstructed line-of-sight between personal device 305 and object 335. Personal device 305 is mounted upon a person who is holding object 335, the mounting being carried out in a manner so as to avoid any obstruction that may be present between personal device 305 and object 335. The resulting unobstructed line-of-sight between personal device 305 and object 335 eliminates erroneous measurements as may be present in existing art due to an obstruction. The positioning of personal device 305 with reference to object 335 and the maintenance of unobstructed line-of-sights will be described below in more detail using other figures.

Light generator 350 contains an on-axis light source 315 located close to imager 310 and an off-axis light source 320 that is located further away from imager 310. Both the light sources are in the same plane as imager 310. Two optical signals are transmitted by light generator 350 over optical path 351. The first optical signal of wavelength $\lambda_1$ is generated by the on-axis light source 315, while the second optical signal of wavelength $\lambda_2$ is generated by the off-axis light source 320. The two signals are reflected by light reflector 325 towards imager 310 along optical path 311. The angle at which each of the two signals is transmitted from light generator 350 is referred to, for the purpose of description, as illumination angle $\theta_1$. The angle at which each of the two reflected signals is incident upon imager 310 is referred to, for the purpose of description, as detection angle $\theta_2$. Illumination angle $\theta_1$ of on-axis light source 315 is smaller than the illumination angle $\theta_1$ of off-axis light source 320. Consequently, the intensity of on-axis light of wavelength $\theta_1$ that is reflected by light reflector 325 towards imager 310 is greater than the intensity of off-axis light of wavelength $\lambda_2$ reflected towards imager 310.

Imager 310 generates two sets of image data. The first set of image data is collected in response to the reflected light of wavelength $\lambda_1$ while the second set of image data is collected in response to the reflected light of wavelength $\lambda_2$. The first set of image data, referred to herein as on-axis image data, is representative of light of wavelength $\lambda_1$ that is reflected by light reflector 325 and by other objects, including object 335, that are illuminated by on-axis light source 315. The second set of image data, referred to herein as off-axis image data, is representative of light of wavelength $\lambda_2$ that is reflected by light reflector 325 and by other objects, including object 335, that are illuminated by off-axis light source 320. The intensity values of data points generated from light reflected by light reflector 325 will be much greater at wavelength $\lambda_1$ than at wavelength $\lambda_2$ because reflected on-axis light is greater than reflected off-axis light.

While the intensity of light reflected by light reflector 325 towards imager 310 is much greater at wavelength $\lambda_1$ than at wavelength $\lambda_2$, the intensity of light at either wavelength reflected by other objects will be roughly the same assuming that the intensity of light emitted from the two light sources in light generator 350 is roughly equal. Consequently, the position of light reflector 325 can be defined by generating a difference image from the on-axis and off-axis image data. Because most of the data points in the two sets of image data are the same, most of the corresponding data points will cancel each other out, with the exception of data points corresponding to the light reflector 325.

Processor 330 receives image data from imager 310 via communication link 331, carries out the generation of the difference image, and derives positional information from the difference image. In the exemplary embodiment of FIG. 3, processor 330 is shown contained in personal device 305. In other embodiments, processor 330 or some parts of processor 330 may be located external to personal device 305. Personal device 305 is typically housed in an enclosure that is suitable for mounting on a person holding object 335. Some examples of such enclosures are: a clip-on identification (ID) badge, a box attached to a strap worn around a person's neck, and a box clipped on to a person's pocket.

In the exemplary embodiment of FIG. 3, object 335 is a pointing device used by a speaker. The pointing device will be described below in more detail using other figures. In alternative implementations, object 335 is a hand-held remote control, an electronic game-playing glove, a video game-playing gun, an electronic pen, and an electronic baton.

Figure 4:
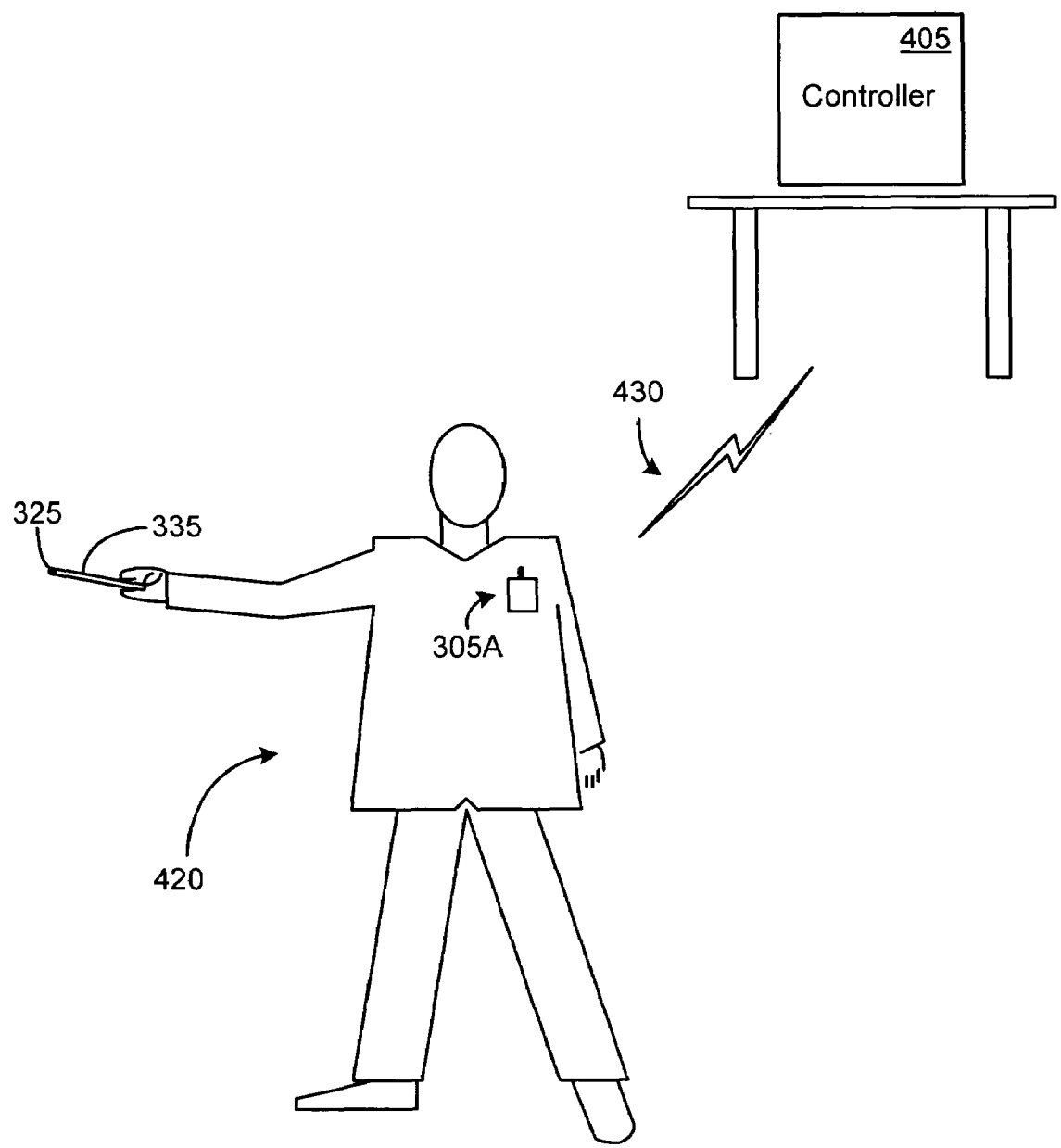
FIG. 4 shows a first exemplary personal device, which is a part of the system of FIG. 3, mounted on a person holding the object containing the reflector.

FIG. 4 shows a first exemplary personal device 305A mounted on a person 420 holding object 335 containing reflector 325. In this example, personal device 305A comprises an ID-badge clipped on to the upper garment worn by person 420. In alternative embodiments, the ID-badge is clipped on to various other personal effects of person 420 such as a trouser, a belt, footwear, and headwear. Some examples of clip-on locations on person 420 are: the shoulder area, the forearm area, the upper arm area, the right side torso, the waist area, and the leg area.

The clip-on location is selected to provide an unobstructed line-of-sight between personal device 305A and object 335 while permitting person 420 to move around freely waving object 335 in various directions. For example, the central chest area of person 420 is selected to provide nearly 180 degrees of unobstructed line-of-sight coverage in front of person 420. The right upper arm area is selected to provide frontal as well as lateral unobstructed line-of-sight coverage between personal device 305A and object 335 held in the right hand. As an additional example, personal device 305A is placed on top of a hat worn by person 420 to obtain a 360 degree line-of-sight coverage at head level and above, while also providing additional unobstructed line-of-sight coverage downwards in an area defined by a cone having the head as the apex of the cone.

Attaching personal device 305A to the desired clip-on location in the manner described above, enables the first unobstructed line-of-sight and the second unobstructed line-of-sight between personal device 305A and object 335. Personal device 305A is communicatively coupled to a controller 405 through a wireless link 430. Controller 405 processes information received from processor 330, which is contained in personal device 305A, and generates positional and/or orientation information of object 335. Some non-exhaustive examples of controller 405 include a desktop personal computer, a laptop, a hand-held computer, and a video game controller. Wireless link 430 is a radio-frequency (RF) link in a first embodiment, and an infra-red (IR) link in a second embodiment in accordance with the invention.

Personal device 305A includes a power source such as a battery that powers the electronic circuits contained in personal device 305A. Such electronic circuits include, for example, an image processing circuit coupled to imager 310 and an RF transceiver for communicating data to/from other elements outside personal device 305A. In a first embodiment, the image processing circuit receives image data from the imager and generates positional and/or orientation information of object 335. The RF transceiver transmits the generated information to controller 405, where the information is used for various purposes, such as for controlling a video game display. The transmitted information is generally in a compressed format for purposes of transmission efficiency such as reduced transmission bandwidth. In a second embodiment, raw image data from imager 310 is transmitted by the RF transceiver to controller 405. Controller 405 then generates positional and/or orientation information of object 335.

Figure 5:
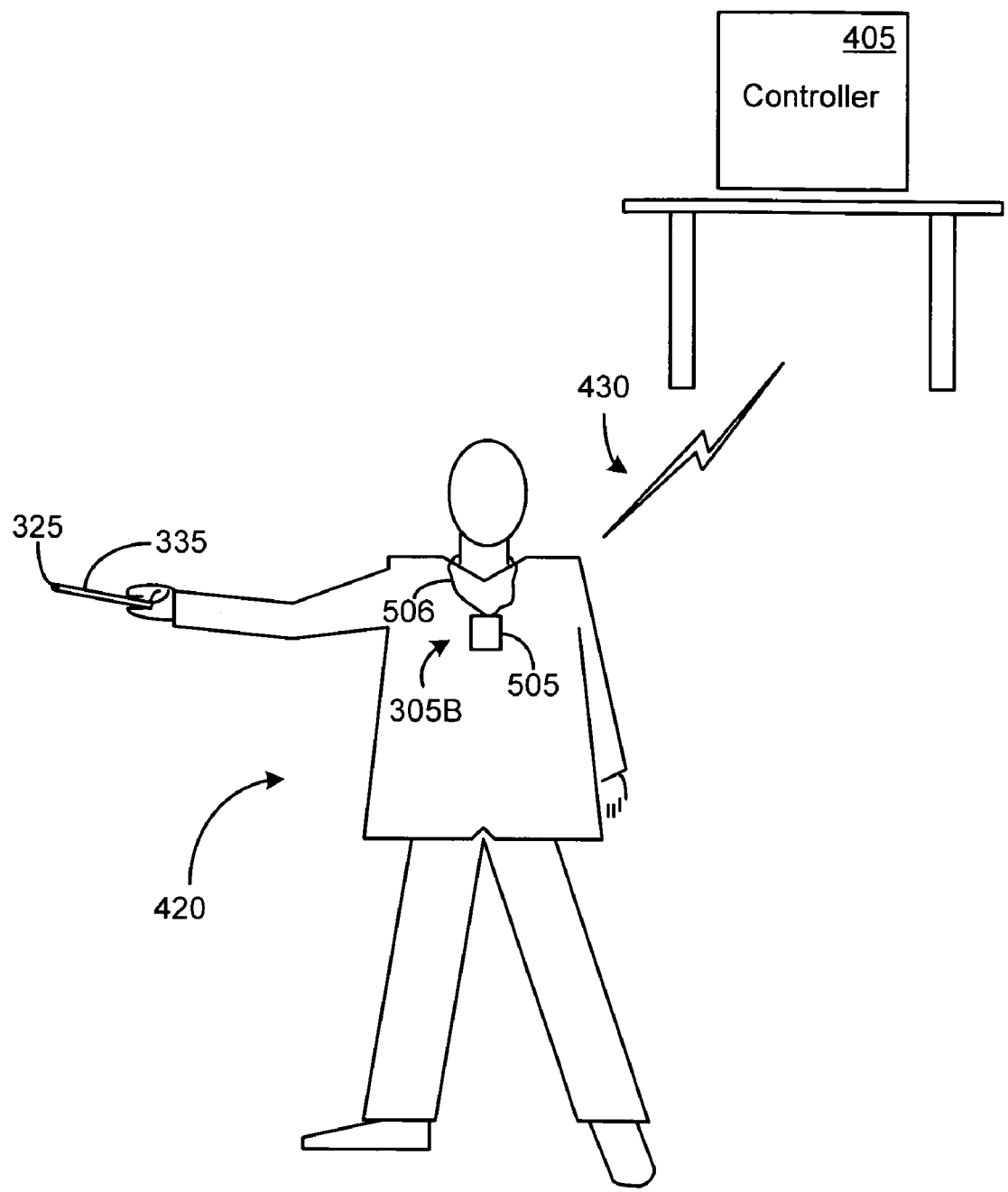
FIG. 5 shows a second exemplary personal device mounted on a person holding the object containing the reflector.

FIG. 5 shows a second exemplary personal device 305B mounted on person 420 holding object 335 containing reflector 325. In this example, personal device 305B comprises a box 505 attached to a strap 506 worn around the neck of person 420. The clip-on location is selected to provide an unobstructed line-of-sight between personal device 305B and object 335 while permitting person 420 to move around freely waving object 335 in various directions.

Figure 6:
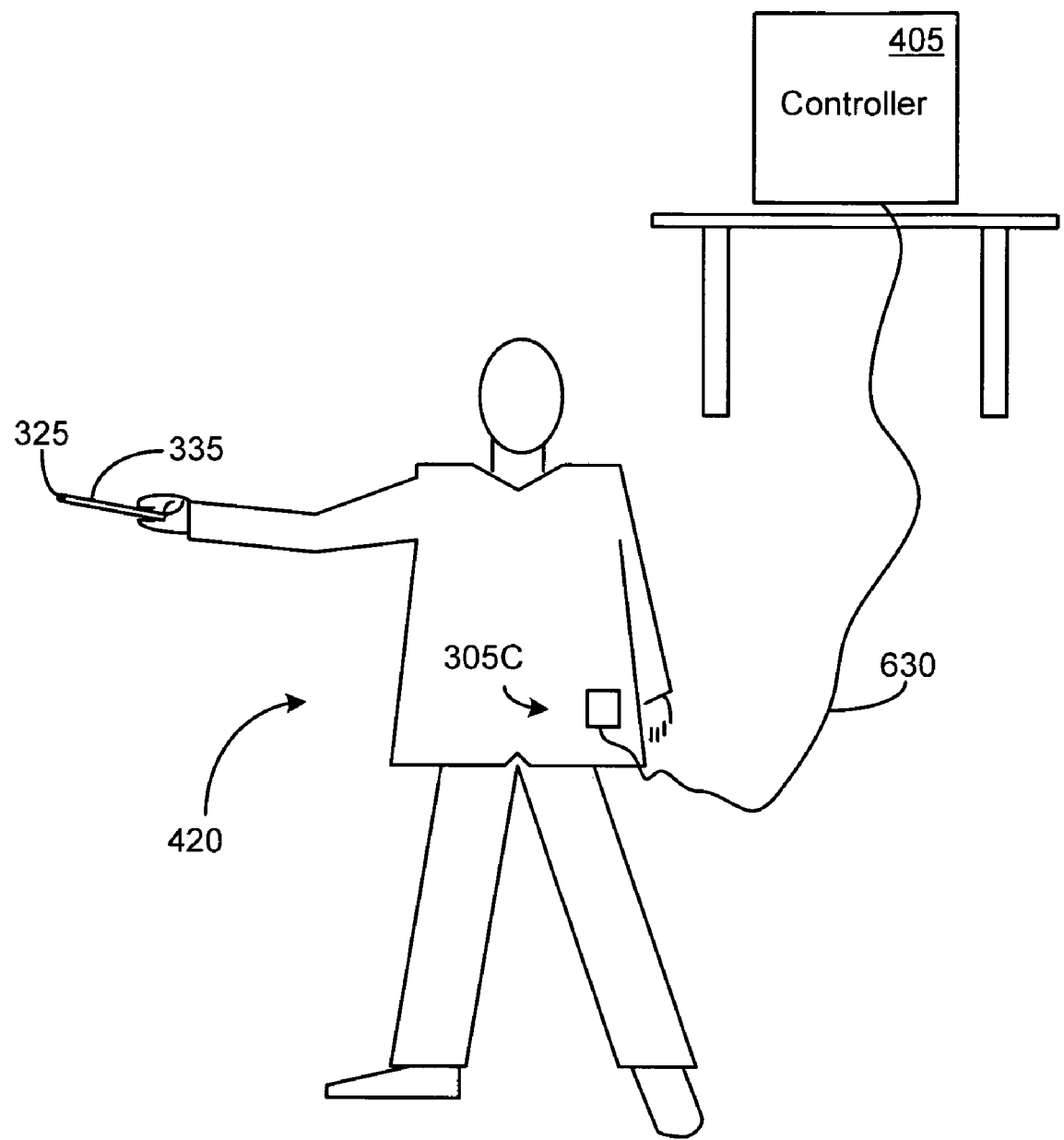
FIG. 6 shows a third exemplary personal device mounted on a person holding the object containing the reflector.

FIG. 6 shows a third exemplary personal device 305C mounted on person 420 holding object 335 containing reflector 325. In this example, personal device 305C comprises a box clipped on to the outside of a jacket pocket. The clip-on location is selected to provide an unobstructed line-of-sight between personal device 305C and object 335 while permitting person 420 to move around freely waving object 335 in various directions. Personal device 305C is communicatively coupled to controller 405 through a wire-line link 630. Positional and/or orientation information of object 335, or raw image data, is transmitted from personal device 305C through wire-line link 630 to controller 405. In one exemplary embodiment, wire-line link 630 is a universal serial bus (USB) link. Electronic circuits of personal device 305C are powered from controller 405 through the USB link.

Figure 7A:
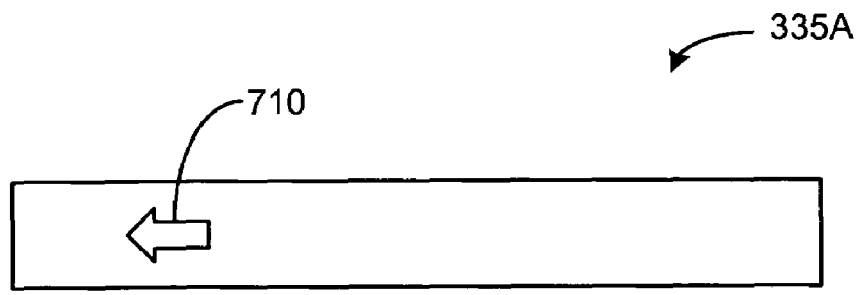
FIG. 7A shows an object having an exemplary reflector containing an orientation-indicting element.
Figure 7B:
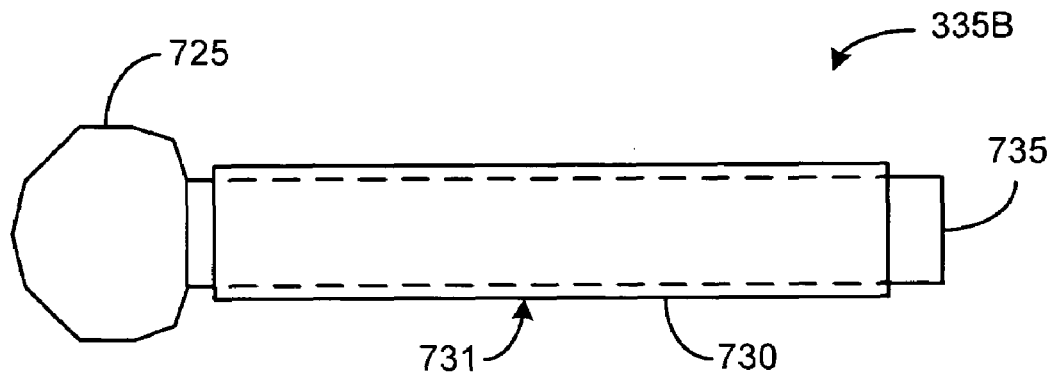
FIG. 7B shows another object having an exemplary pair of reflectors to provide orientation information.
Figure 7C:
FIG. 7C shows yet another object having another exemplary pair of reflectors to provide orientation information.

Attention is now drawn to FIGS. 7A, 7B, and 7C that show various embodiments of an object containing reflecting elements used in system 300 to generate positional information as well as orientation information of the object. In the description below, reference is made to several components that are not shown in FIGS. 7A, 7B, and 7C. These components can be found in FIG. 3.

FIG. 7A shows an example of an object 335A provides positional as well as orientation information using an orientation-indicating element comprising reflector 710 which is shaped as an arrow. In other embodiments, reflector 710 will be formed of other shapes and patterns that provide directional information. On-axis and off-axis light from light generator 325 is directed upon reflector 710, which reflects light towards imager 310. Imager 310 receives the reflected light and generates a difference image as described above using FIG. 3. The difference image provides a definitive identification of the position of reflector 710 thereby providing positional information of object 335A. The difference image further provides a definitive identification of the direction in which the arrow is pointing, from which orientation information of object 335A can be generated. For example, when object 335A is pointed vertically upwards, the difference image of the arrow also points upwards thereby permitting imager 310 to generate orientation information indicating that object 335A is being pointed upwards.

FIG. 7B shows an exemplary object 335B that provides positional as well as orientation information using an orientation-indicating element incorporating two reflecting elements. Object 335B is shaped like a conventional microphone having a gripping handle. The first reflecting element 725 corresponds to the spherical transducer of the conventional microphone, while the second reflecting element 730 is wrapped around gripping handle 735.

In one embodiment, first reflecting element 725 has a multi-faceted reflecting surface which reflects light transmitted by light generator 350. The multi-faceted surface provides reflectivity over a large 3-D space, thereby enabling multiple unobstructed line-of-sights between object 335B and personal device 305. In an alternative embodiment, first reflecting element 725 has a largely spherical reflecting surface, while second reflecting element 730 presents a largely cylindrical reflecting surface 731.

On-axis and off-axis light from light generator 325 is directed upon first reflecting element 725 as well as second reflecting element 730. Both the reflecting elements reflect light towards imager 310. Imager 310 receives the reflected light and generates a difference image as described above using FIG. 3. The difference image provides a definitive identification of the position of first reflecting element 725 thereby permitting imager 310 to generate positional information of object 335B.

The difference image further provides a definitive identification of the position of second reflecting element 730. The position of second reflecting element 730 is compared to that of first reflecting element 725 to generate comparative positional information. The comparative positional information allows imager 310 to generate orientation information of object 335B. For example, if first reflecting element 725 is located to the left of second reflecting element 730, the generated orientation information indicates that object 335B is being pointed towards the left. On the other hand, For example, if first reflecting element 725 is located to the right of second reflecting element 730, the generated orientation information indicates that object 335B is being pointed towards the right. Similarly, if first reflecting element 725 is located above second reflecting element 730, the generated orientation information indicates that object 335B is being pointed upwards.

FIG. 7C shows yet another exemplary object 335C that provides positional information as well as orientation information using an orientation-indicating element formed of two reflecting elements. In a first embodiment, first reflecting element 740 is used in conjunction with second reflecting element 745 to generate orientation information of object 335C. In a second embodiment, second reflecting element 745, which is arrow-shaped, is used independently to generate orientation information of object 335C. In a third embodiment, second reflecting element 745 is used independently to generate positional as well as orientation information of object 335C.

Figure 8:
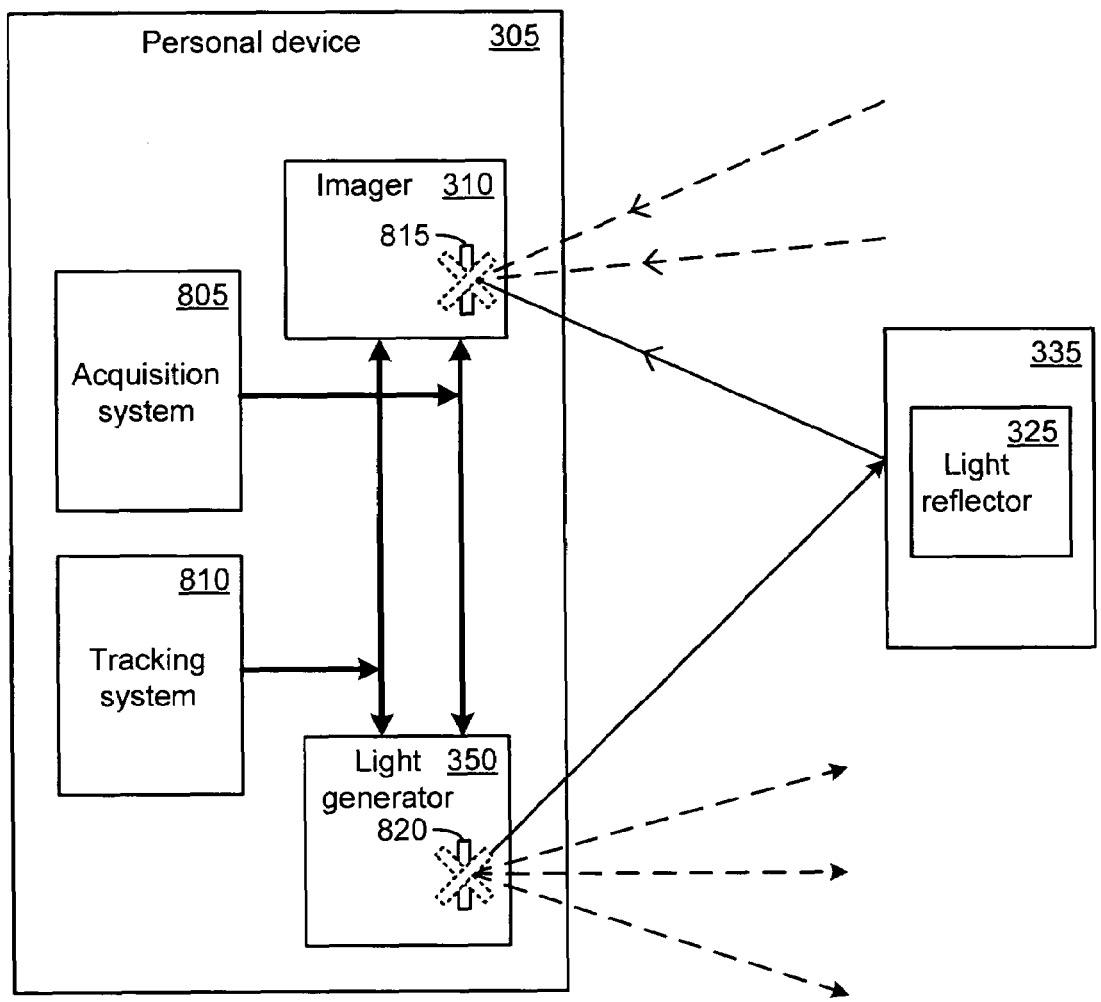
FIG. 8 shows an acquisition system and a tracking system that are contained in an exemplary personal device.

FIG. 8 shows an exemplary embodiment of personal device 305 containing an acquisition system 805 that is used to automatically acquire unobstructed line-of-sight between personal device 305 and object 335. Automatic acquisition is in contrast to the manual operation described above with reference to other figures wherein a person mounted personal device 305 to obtain unobstructed line-of-sight.

Personal device 305 further contains a tracking system 810 that is used to automatically maintain the unobstructed line-of-sight between personal device 305 and object 335 after acquisition system 805 has automatically acquired unobstructed line-of-sight.

In this exemplary embodiment, imager 310 has a pixelated detector 815 mounted on an adjustable platform, which will be described below using other figures. The adjustable platform is oriented in different directions by one or servo-motors attached to the adjustable platform. Pixelated detector 815 captures light received from object 335, which is used to generate on-axis and of-axis images of object 335. Mounting pixilated detector 815 on an adjustable platform allows pixilated detector 815 to have a reduced field-of-view (FOV) because pixilated detector 815 can be oriented to point specifically towards object 335, in comparison to a detector having a fixed, wide-angle FOV encompassing object 335 as well as other undesired objects. The reduced FOV of pixilated detector 815 leads to a desirable increase in image resolution of object 335 because all the pixel elements of pixilated detector 815 can be used to obtain an image of object 335. On the other hand, obtaining higher resolution of an image of an object, such as object 335, when using a wide-angle FOV detector generally requires increasing the overall pixel element density of the wide-angle detector thereby leading to various handicaps, including high cost. The servo-motors of the adjustable platform are initially driven in a scanning mode using control signals generated by acquisition system 805. The scanning mode is used for acquiring an unobstructed line-of-sight between imager 310 and object 335.

In the scanning mode, pixelated detector 815, which is mounted on the adjustable platform, is oriented in various directions until an image of object 335 is acquired. Once the image is acquired, which indicates acquisition of unobstructed line-of-sight, the servo-motors of the adjustable platform of imager 310 are driven in a tracking mode using control signals generated by tracking system 810. The control signals generated by tracking system 810 ensure that the adjustable platform constantly tracks object 335. This process is carried out in part by using pixelated detector 815 to obtain an image of object 335 in a regular or intermittent fashion. In one embodiment, the image is obtained at frequent preset intervals, while in another embodiment, the image is obtained infrequently, for example when line-of-sight is lost. When line-of-sight is lost, tracking system 810 communicates with acquisition system 805 to re-initiate re-acquisition.

Light generator 350 contains the two light sources—the on-axis light source and the off-axis light source. Similar to detector 815, the two light sources are mounted on an adjustable platform (not shown) that is oriented in different directions by servo-motors attached to the platform. This platform is operated upon by acquisition system 805 and tracking system 810 for acquisition and tracking in a manner similar to the one described above with reference to imager 310.

Figure 9A:
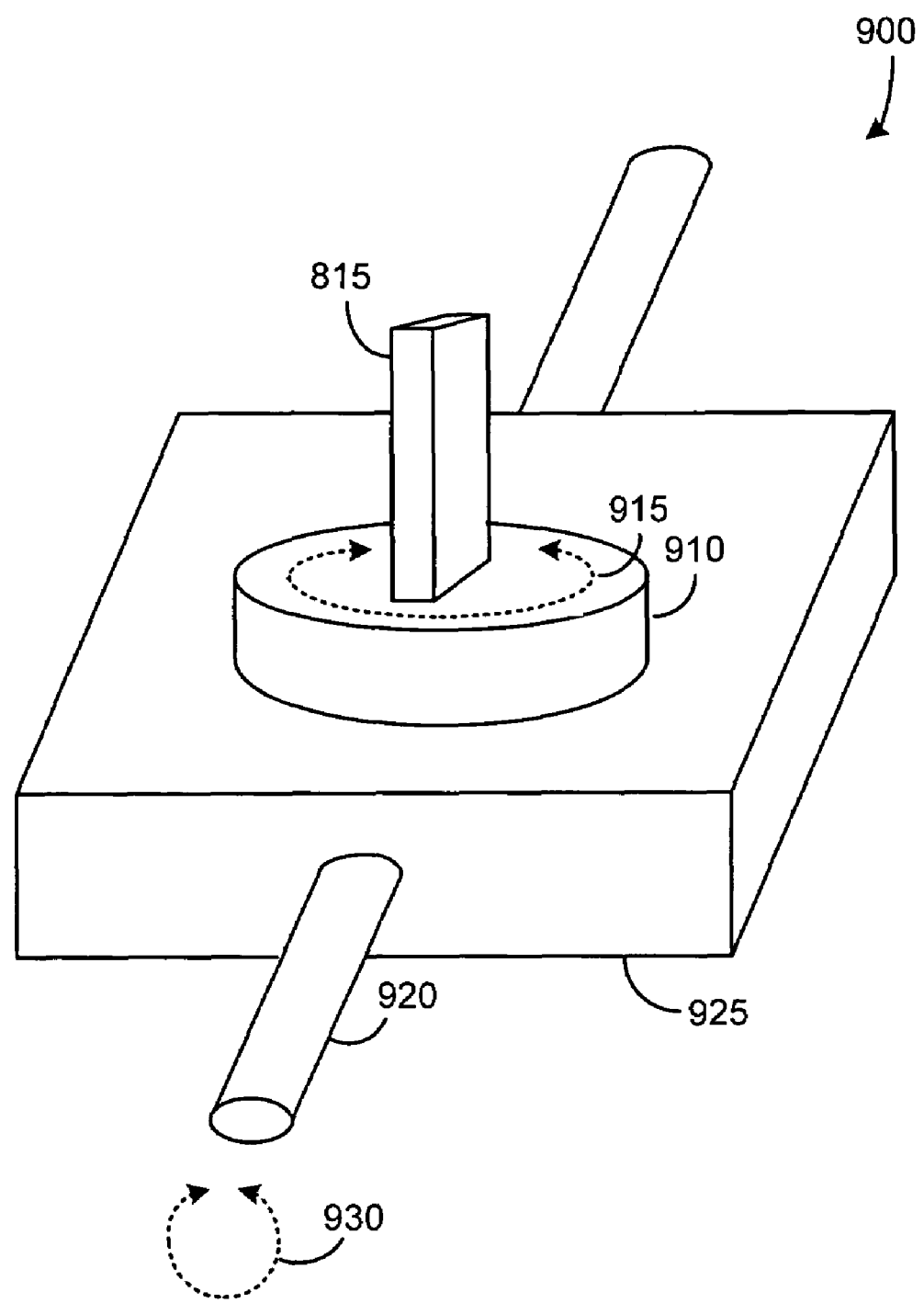
FIG. 9A is an isometric view of an exemplary adjustable platform used in the acquisition and tracking systems of FIG. 8.

FIG. 9A shows a perspective view of an exemplary embodiment in accordance with the invention, of an adjustable platform 900 for orienting pixelated detector 815 of imager 310. A similar adjustable platform is used in light generator 350 for orienting the on-axis and off-axis light sources. Pixelated detector 815 is mounted on a rotatable platform 910. A major surface of pixelated detector 815 is oriented to receive reflected light from object 335. Rotatable platform 910, which is rotatable bi-directionally as indicated by dotted line 915, is located upon a tiltable platform 925. A rotatable shaft 920 traverses tiltable platform 925 and is operable to adjust the tilt angle of tiltable platform 925. Rotatable shaft 920 is rotatable bi-directionally as indicated by dotted line 930.

Rotatable shaft 920 and rotatable platform 910 are driven by servo-motors (not shown) that are operated using control signals from acquisition system 805 or tracking system 810. Rotatable shaft 920 and rotatable platform 910 are operated to set a desired vertical angle of orientation and a desired lateral angle of orientation respectively for receiving reflected light from object 335. Further operations of rotatable shaft 920 and rotatable platform 910 are described below using FIGS. 9B and 9C.

Figure 9B:
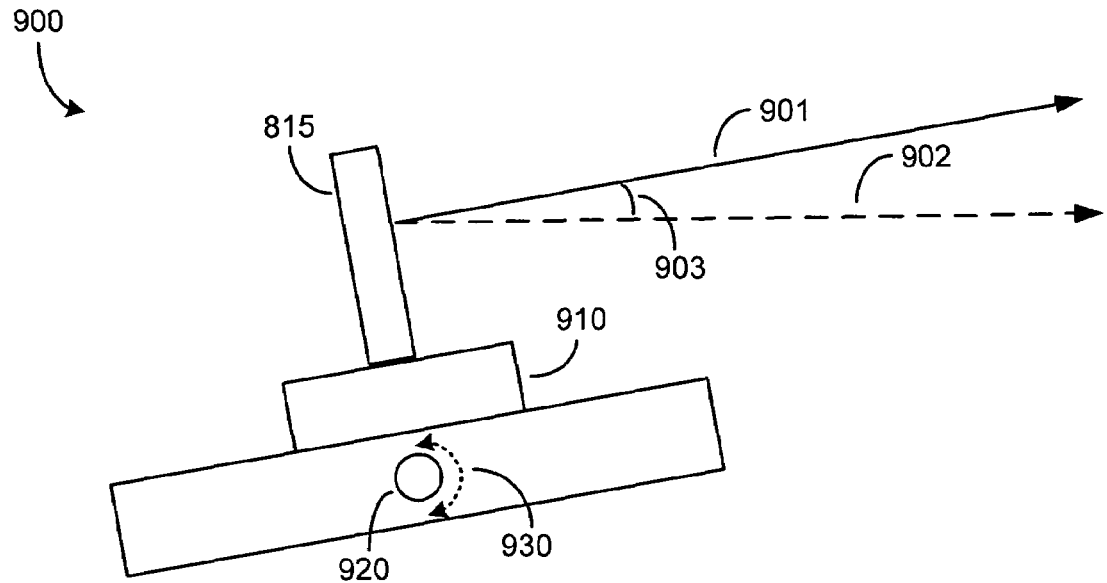
FIG. 9B shows a side-view view of the adjustable platform of FIG. 9A.

FIG. 9B shows a side-view of adjustable platform 900 to describe setting a desired vertical angle of orientation, often referred to as setting a tilt angle. When rotatable shaft 920 is set in a first position, pixelated detector 815 is oriented along an axis that is termed in this example as reference axis 901. When rotatable shaft 920 is set to a second position, pixelated detector 815 is oriented along a second axis 902 which has a vertical angle 903 of orientation with reference to reference axis 901. In this manner, rotatable shaft 920 can be oriented in various directions to orient pixelated detector 815 in a variety of vertical angles.

Figure 9C:
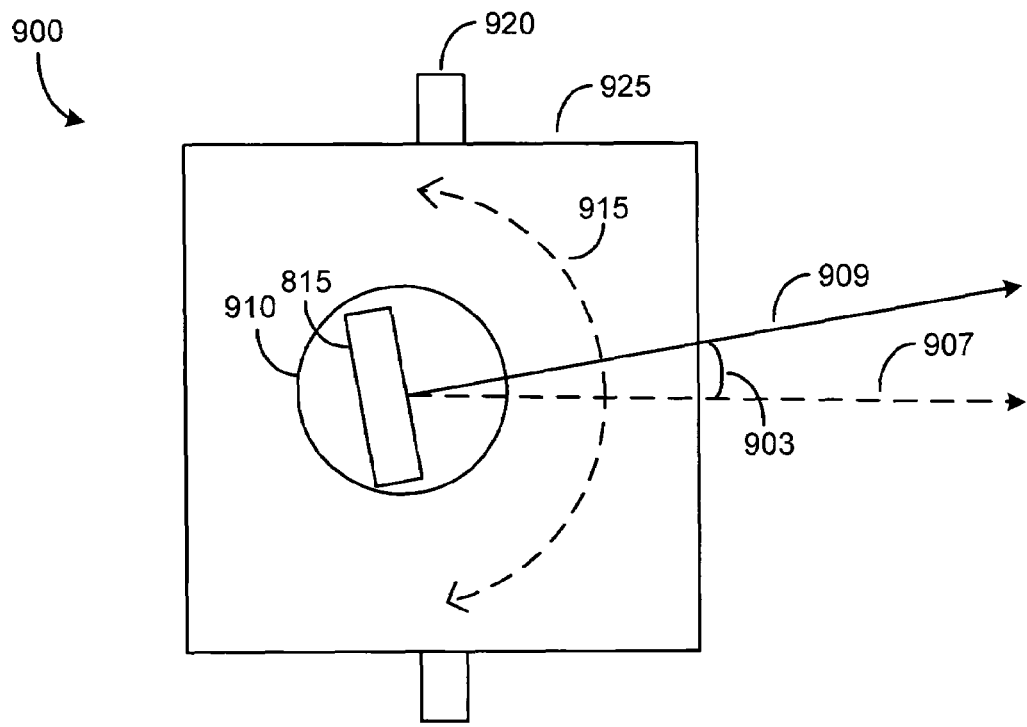
FIG. 9C shows a top-view view of the adjustable platform of FIG. 9A.

FIG. 9C shows a top-view of adjustable platform 900 to describe setting the desired lateral angle of orientation, often referred to as setting a pan angle. When rotatable platform 910 is set in a first position, pixelated detector 815 is oriented along an axis that is termed in this example as reference axis 906. When rotatable platform 910 is set to a second position, pixelated detector 815 is oriented along a second axis 907 which has a lateral angle 904 of orientation with reference to reference axis 906. In this manner, rotatable platform 910 can be oriented in various directions to orient pixelated detector 815 in a variety of lateral angles.

Figure 10:
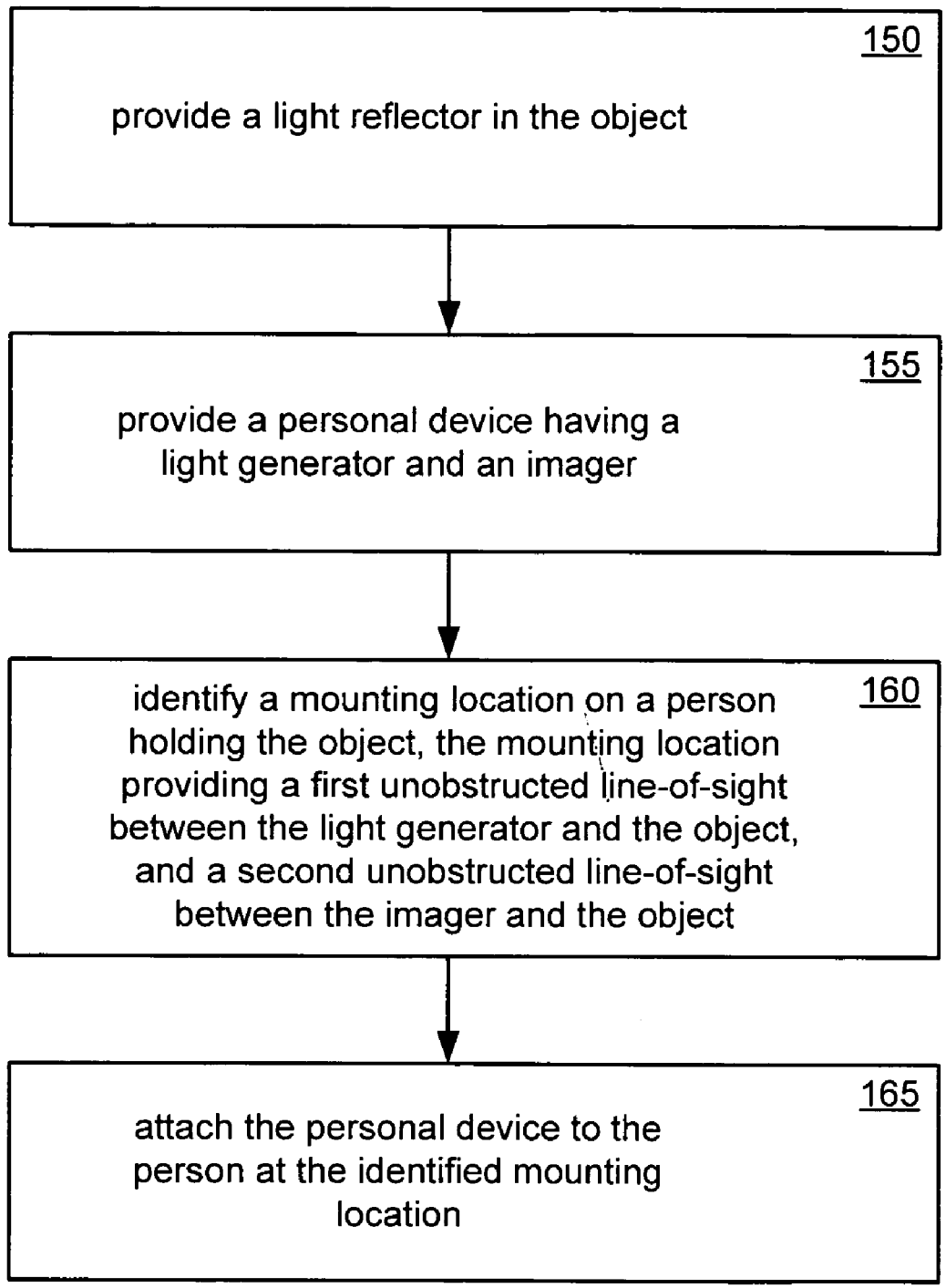
FIG. 10 shows a flowchart to describe a method of generating positional and orientation information of an object.

FIG. 10 shows a flowchart to describe an exemplary method for generating positional and orientation information of an object. It will be understood that, although one sequence of method steps are described below, other implementations include alternative method steps that are used to generate positional and orientation information. Moreover, steps may be executed out of order from that shown or discussed, including substantially concurrently or in reverse order.

In block 150, a light reflector is provided in the object. In one exemplary embodiment, providing such a reflector involves incorporating into the object, a reflector having a mostly spherical reflecting surface.

In block 155, a personal device containing a light generator and an imager is provided. The light generator typically generates light such as on-axis light and off-axis light, which is directed towards the object having the reflector. The object reflects this light towards the imager which uses the reflected light to generate one or more images of the object.

In block 160, a mounting location is identified on a person holding the object. In one example, the person is a speaker holding the object, which in this example, is a pointing device. The mounting location on the person is selected to provide a first unobstructed line-of-sight between the light generator and the object, and a second unobstructed line-of-sight between the imager and the object. In one exemplary embodiment, the mounting location is a lapel of a coat worn by the person holding the object. In another exemplary embodiment, the mounting location is the upper arm of the person holding the object.

Typically, the mounting location is selected under the assumption that the object will be moved through a number of positions over time. For example, when the object is a pointing device, the speaker holding the pointing device will be carrying out various motions that place the pointing device at various locations and in various orientations. Therefore, in an example where the speaker holds the pointing device in his or her right hand, one suitable mounting location is the speaker's right upper forearm. This mounting location allows a wide area of unobstructed lineof-sight coverage, because no obstructions are generally present between the speaker's upper forearm and the hand holding the pointing device.

In block 165, the personal device is attached to the person at the identified mounting location. In a first exemplary embodiment, the personal device is attached to a coat pocket using a clip that is a part of the personal device. In a second exemplary embodiment, the personal device is attached to the upper arm of the person, using a strap that is a part of the personal device.

The above-described embodiments are merely set forth for a clear understanding of the principles of the disclosure. Many variations and modifications may be made without departing substantially from the disclosure and will be apparent to those skilled in the art. All such modifications and variations are included herein within the scope of this disclosure.

I claim:

1. A system for generating positional information of an object, the system comprising:
   a light reflector housed in the object;
   a light generator configured to have a first unobstructed line-of sight with the light reflector, the light generator further configured to direct light upon the light reflector;
   an imager configured to have a second unobstructed line-of-sight with the light reflector, the imager further configured to receive reflected light from the light reflector; and
   an acquisition system operable to control the light generator to acquire the first unobstructed line-of-sight with the light reflector, and further operable to control the imager to acquire the second unobstructed line-of-sight with the light reflector.

2. The system of claim 1, wherein the light generator and the imager are housed in a personal device mounted on a first location upon a person holding the object, the first location selected so as to provide the first unobstructed line-of-sight and the second unobstructed line-of-sight.

3. The system of claim 2, wherein the object is a handheld pointer.

4. The system of claim 3 wherein the personal device is one of a clip-on personal device and a personal device attached to a strap.

5. The system of claim 3, wherein the light reflector comprises a first reflecting element.

6. The system of claim 5, further comprising:
   a processor configured to receive an electrical signal, the electrical signal being generated by the imager from reflected light received from the first reflecting element, the processor further configured to use the electrical signal to generate positional information of the object.

7. The system of claim 5, wherein the light reflector further comprises a second reflecting element.

8. The system of claim 7, further comprising:
   a processor configured to receive an electrical signal, the electrical signal being generated by the imager from reflected light received from the first reflecting element and the second reflecting element, the processor further configured to use the electrical signal to generate orientation information of the object.

9. The system of claim 1, further comprising:
   a tracking system operable to control the light generator to maintain the first unobstructed line-of-sight with the light reflector, and further operable to control the imager to maintain the second unobstructed line-of sight with the light reflector.

10. A personal device for generating positional information of an object, the device comprising:
    a light generator configured to have unobstructed line-of-sight with a first reflecting element housed in the object, the light generator further configured to direct light upon the first reflecting element;
    an imager configured to have unobstructed line-of-sight with the first reflecting element, the imager further configured to receive reflected light from the first reflecting element;
    a processor configured to receive a first electrical signal, the first electrical signal being generated by the imager from reflected light received from the first reflecting element, the processor further configured to use the first electrical signal to generate positional information of the object; and
    an acquisition system operable to control the light generator to acquire unobstructed line-of-sight with the first light reflecting element, and further operable to control the imager to acquire unobstructed line-of-sight with the first light reflecting element.

11. The personal device of claim 10, wherein:
    the light generator is further configured to have unobstructed line-of-sight with a second reflecting element housed in the object, the light generator further configured to direct light upon the second reflecting element;
    the imager is further configured to have unobstructed line-of-sight with the second reflecting element, the imager further configured to receive reflected light from the second reflecting element; and
    the processor is further configured to receive a second electrical signal, the second electrical signal being generated by the imager from reflected light received from the first reflecting element and the second reflecting element, the processor being further configured to use the second electrical signal to generate positional information of the object.

12. The personal device of claim 11, further comprising:
    an enclosure housing the light generator, the imager, and the processor; wherein the enclosure is configured for mounting on a person holding the object.

13. The personal device of claim 10, further comprising:
    a tracking system operable to control the light generator to maintain unobstructed line-of-sight with the first light reflecting element, and further operable to control the imager to maintain the second unobstructed line-of-sight with the first light reflecting element.

14. A method for generating positional information of an object, the method comprising:
    providing a light reflector in the object;
    providing a personal device comprising a light generator and an imager;
    identifying a mounting location on a person holding the object, wherein the mounting location provides a first unobstructed line-of-sight between the light generator and the object, and a second unobstructed line-of-sight between the imager and the object;
    attaching the personal device to the person at the identified mounting location;
    generating in the light generator, an on-axis light and an off-axis light;
    transmitting the on-axis light and the off-axis light towards the object;

receiving in the imager, light reflected by the object;
generating an on-axis image and off-axis image;
generating a difference image from the on-axis image and the off-axis image;
using the difference image to generate positional information of the reflector; and
using the positional information of the reflector to generate positional information of the object.

15. The method of claim 14, wherein the person holding the object moves the object through a plurality of positions.

16. The method of claim 15, wherein the light reflector has a substantially spherical reflecting surface.

17. The method of claim 14, further comprising:
using the difference image to generate orientation information of the reflector; and
using the orientation information of the reflector to generate orientation information of the object.

* * * * *